(12) United States Patent
Lindsay et al.

(10) Patent No.: US 7,721,409 B2
(45) Date of Patent: May 25, 2010

(54) COLD FORMED DIFFERENTIAL HOUSING WITH INTEGRATED RING GEAR

(75) Inventors: Alan Lindsay, Scarborough (CA); Jianwen Li, Mississauga (CA)

(73) Assignee: Magna Powertrain Inc., Concord, Ontario (CA)

( * ) Notice: Subject to any disclaimer, the term of this patent is extended or adjusted under 35 U.S.C. 154(b) by 1306 days.

(21) Appl. No.: 10/528,538

(22) PCT Filed: Sep. 29, 2003

(86) PCT No.: PCT/CA03/01486

§ 371 (c)(1),
(2), (4) Date: Aug. 24, 2005

(87) PCT Pub. No.: WO2004/028722

PCT Pub. Date: Apr. 8, 2004

(65) Prior Publication Data

US 2006/0143917 A1    Jul. 6, 2006

(51) Int. Cl.
*B23P 13/04* (2006.01)
(52) U.S. Cl. .......................... 29/557; 29/893; 29/893.1; 29/893.2; 29/893.32; 72/71; 72/82; 72/83; 72/84
(58) Field of Classification Search ............... 29/557, 29/893, 893.1, 893.2, 893.32; 72/71, 82–84
See application file for complete search history.

(56) References Cited

U.S. PATENT DOCUMENTS

| | | | | |
|---|---|---|---|---|
| 3,793,703 A | * | 2/1974 | Winkler et al. | ................ 29/463 |
| 4,790,166 A | * | 12/1988 | Kaar | ............................ 72/106 |
| 5,774,986 A | * | 7/1998 | Nishimura et al. | ....... 29/893.32 |
| 6,045,479 A | | 4/2000 | Victoria et al. | |
| 6,061,907 A | | 5/2000 | Victoria et al. | |
| 6,176,152 B1 | * | 1/2001 | Victoria et al. | ................ 74/607 |
| 6,379,277 B1 | | 4/2002 | Victoria et al. | |
| 6,689,009 B1 | * | 2/2004 | Fett | ............................ 475/230 |

FOREIGN PATENT DOCUMENTS

| | | |
|---|---|---|
| EP | 0 979 959 | 2/2000 |
| FR | 786593 | 11/1954 |
| JP | 62132055 | 6/1987 |

* cited by examiner

*Primary Examiner*—David P Bryant
*Assistant Examiner*—Bayan Salone
(74) *Attorney, Agent, or Firm*—Clark Hill PLC

(57) ABSTRACT

A method for making a differential housing having a ring gear integrally formed therein includes the steps of providing a differential housing having an annular rim integrally preformed therein; supporting the differential housing between upper and lower halves of a rotatable holding tool such that the annular rim extends radially outwardly from the holding tool for movement therewith; providing a thickening tool having a tool surface engagable with the annular rim during rotation of the holding tool to form a thickened lip; and providing a gear forming tool engagable with the thickened lip during rotation of the holding tool, whereby a plurality of teeth are formed along the lip to form the ring gear.

10 Claims, 3 Drawing Sheets

COLD FORMED DIFFERENTIAL HOUSING WITH INTEGRATED RING GEAR

FIELD OF THE INVENTION

The invention relates to transaxles for an automotive vehicle, and more particularly, to a differential housing with an integrated ring gear and a method of forming the housing with the ring gear integrated therewith.

DESCRIPTION OF THE RELATED ART

Differential mechanisms are widely used in drive axles in automobiles for transmitting torque from an engine driven transmission output to left and right axle shafts. Wheels are typically secured to the ends of the axle shafts. The differential mechanism typically includes a plurality of gears for allowing the left and right axle shafts to rotate at different speeds while still transmitting torque to the wheels driven by the axle shafts.

Conventional differential mechanisms include an outer housing and a separate ring gear fixedly secured to the outer housing. Producing separate housings and rings gears and later interconnecting the ring gears to the housings requires numerous machining and welding operations. Further, the heat generated during the welding operations tends to distort the housing and the ring gear.

Accordingly, it remains desirable to have a method of forming a differential housing having a ring gear integrally formed therein without the need to weld separate a housing and a ring gear.

SUMMARY OF THE INVENTION

According to one aspect of the invention, a method of making a differential housing having a ring gear integrally formed therein is provided. The method includes the steps of providing a housing blank having an annular rim integrally preformed therein; supporting the housing blank in a rotatable holding tool so that the annular rim extends radially outwardly from the holding tool for rotation therewith; rotating the holding tool; providing a thickening tool for engaging the annular rim during rotation of the holding tool, whereby the annular rim is plastically deformed to form a lip; and providing a gear forming tool for engaging the lip during rotation of the holding tool, whereby a plurality of teeth are formed along the lip to form the ring gear. Also disclosed is a differential housing having an integrally formed ring gear.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
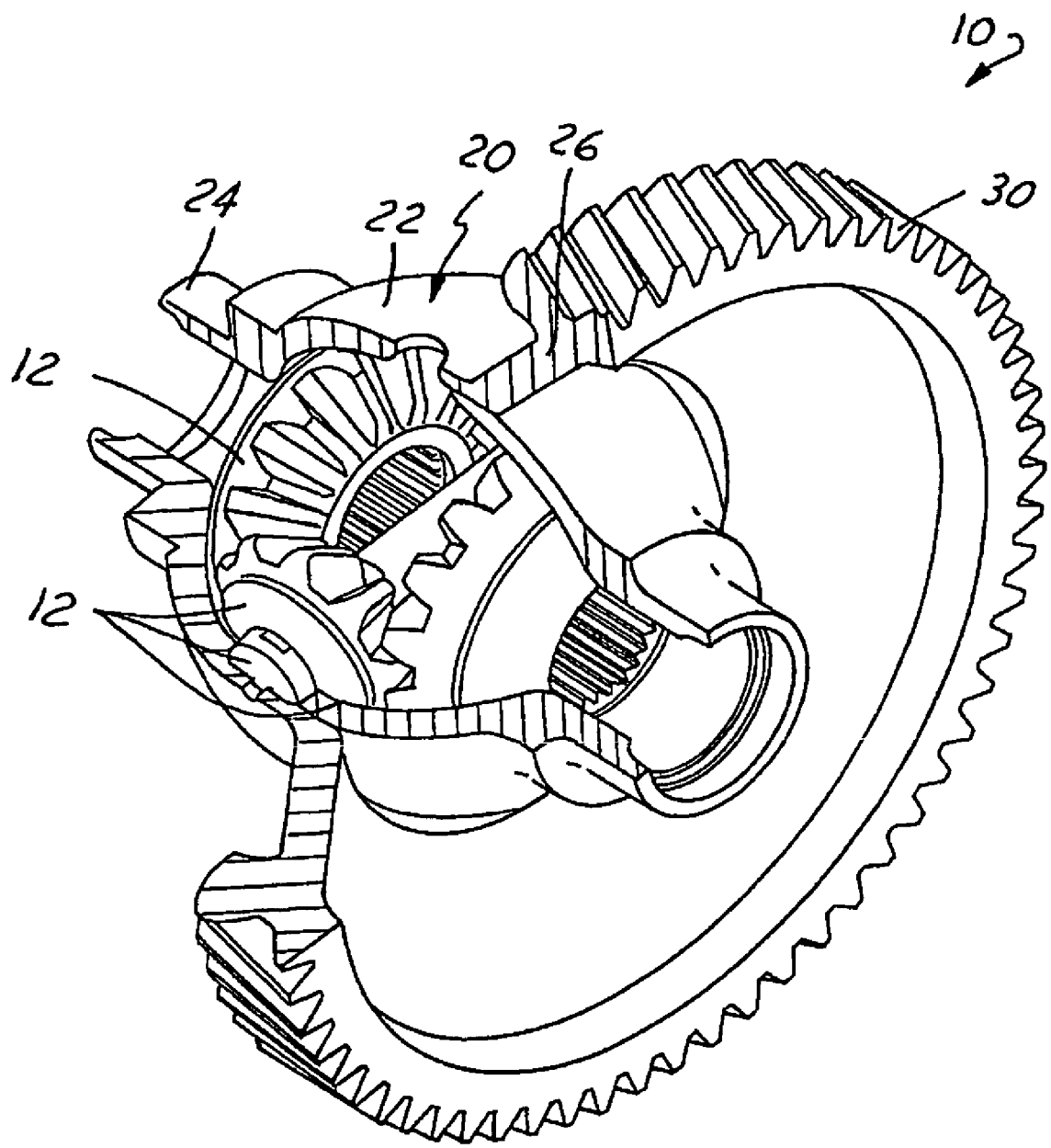
FIG. 1 is a perspective view of a differential assembly according to one aspect of the invention.

Referring to the figures, a differential assembly for a transaxle in an automotive vehicle is generally indicated at 10 in FIG. 1. The differential assembly 10 includes a plurality of pinion gears 12 matingly engaged, as known by those of ordinary skill in the art, for transmitting torque from a transmission output (not shown) to left and right axle shafts and for allowing the left and right axle shafts to rotate at different speeds. The pinion gears are operatively supported by a differential housing 20. The housing 20 includes a generally bell shaped body 22 extending between a generally cylindrical first end 24 and an opposite annular second end 26. A ring gear 30 is integrally formed in the second end 26 of the housing 20. A method of integrally forming the ring gear 30 into the second end 26 of the housing is described in detail below.

Figure 2:
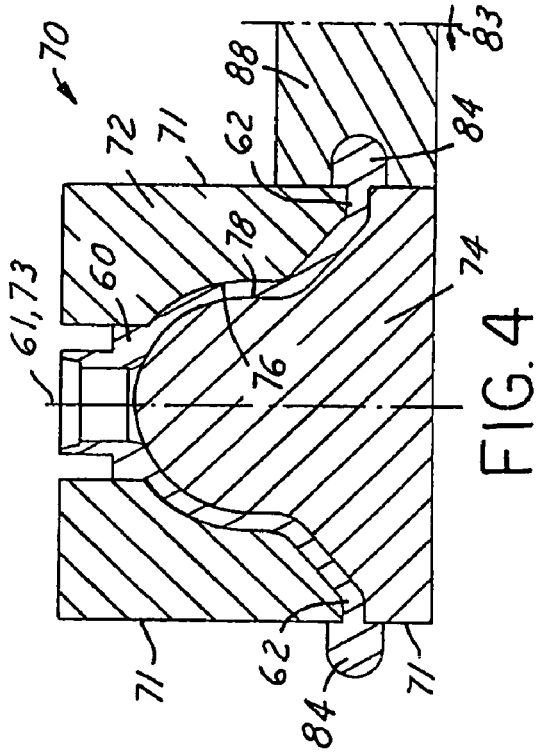
FIG. 2 is a cross sectional view of a die tool and housing blank formed in the die tool according to one aspect of the invention.

Referring to FIG. 2, a mandrel or lower die 40 is provided having a pre-shaped, positive lower tool surface 42. An upper die 50 is provided having a pre-shaped upper tool surface 52. The upper tool surface 52 is generally complementary to the lower tool surface 42. The upper die 50 is forcibly movable relative to the lower die 40 between an open position, as shown in FIG. 2, and a closed position against the lower die 40, by any suitable means, such as a hydraulic press assembly. In the closed position, a cavity 58 is defined between the tool surfaces 42, 52 of the lower 40 and upper 50 dies that generally define the desired shape of the housing 20. In the open position, the lower die 40 is exposed to allow the placement or removal of a housing blank 60.

While the upper die 50 is in the open position, a pre-formed housing blank 60 is placed onto the lower tool surface 42. The upper die 50 is forcibly moved to the closed position, whereby the housing blank 60 is compressed between the lower 42 and upper 52 tool surfaces. The housing blank 60 is flow or cold formed to retain the general shape of the cavity 58. An annular rim 62 is formed in the housing blank 60 defining a rim axis 61.

Figure 4:
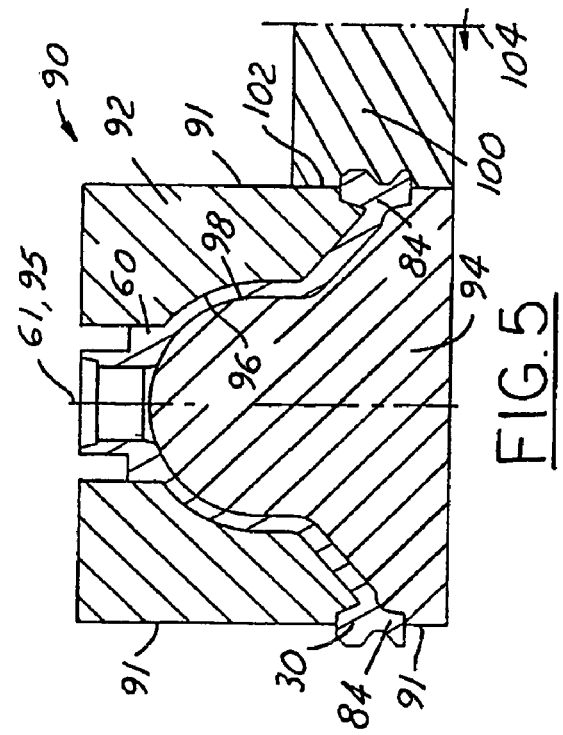
FIG. 4 is a cross sectional view of the holding tool and a second thickening tool.
Figure 3:
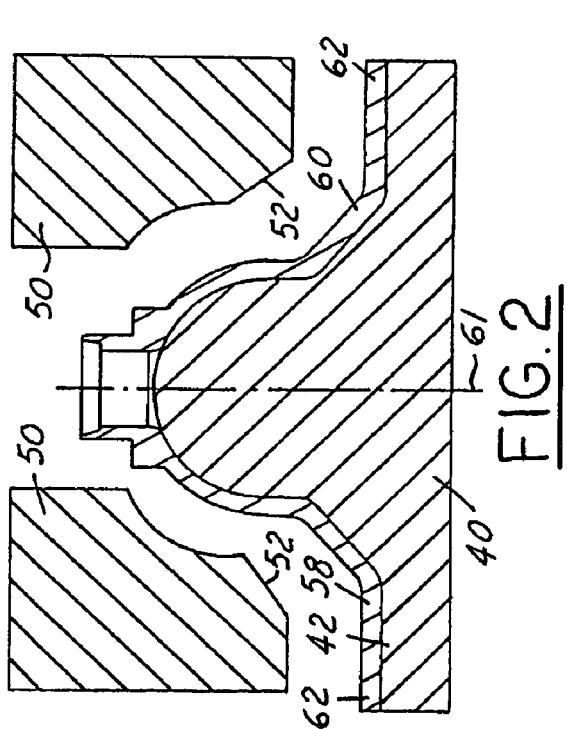
FIG. 3 is a cross sectional view of a holding tool and a thickening tool for forming a thickened lip in the housing blank.

Referring to FIGS. 3 and 4, a first holding tool 70 having a generally cylindrical outer peripheral surface 71 is provided. The first holding tool 70 includes upper 72 and lower 74 holding members. The first holding tool 70 is rotatably supported by external support means (not shown) for rotation about a first rotary axis 75. The upper 72 and lower 74 holding members have complementary upper 76 and lower 78 clamping surfaces, respectively, adapted for nestingly supporting the housing blank 60 therebetween. The upper 76 and lower 78 clamping surfaces each extend between the outer peripheral surface 71. The housing blank 60 is placed into and clamped between the upper 76 and lower 78 clamping surfaces such that the rim axis 61 is aligned with the first rotary axis 75 and the rim 62 protrudes radially beyond the outer peripheral surface 71.

A thickening tool 80 having a forming surface 82 for plastically deforming the rim 62 is provided and rotatably supported by external support means (not shown) for rotation about a second rotary axis 83.

The first holding tool 70 and thickening tool 80 are rotated in opposite directions about their respective first 75 and second 83 rotary axes by any suitable means, such as an electric motor, at preselected fixed or variable speeds. The housing blank 60, clamped between the upper 76 and lower 78 clamping surfaces, rotates with the holding tool 70. The thickening tool 80 is displaced toward the first holding tool 70 by any suitable means, such as a hydraulic cylinder, so that the forming surface 82 frictionally engages the rim 62. The forming surface 82 is forcibly held against the rim 62 until the outer periphery of the rim 62 is plastically deformed into a thickened or bulbuous annular lip 84, as shown in FIG. 3. The forming surface 82 may be held against the rim 62 continuously in a single pass or in successive passes until a desired shape of the lip 84 is achieved. Second 88 or third (not shown) thickening tools may be utilized in succession until the desired shape of the lip 84 is achieved, as shown in FIG. 4. The housing blank 60 is removed from between the upper 76 and lower 78 clamping surfaces.

Figure 5:
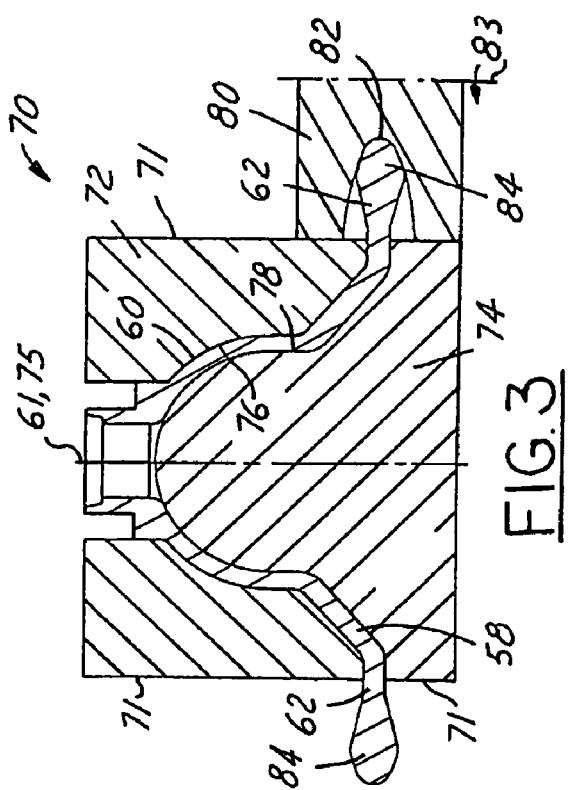
FIG. 5 is a cross sectional view of the holding tool and a gear forming tool for forming the ring gear from the thickened lip.

Referring to FIG. 5, a second holding tool 90 having a generally cylindrical outer peripheral surface 91 is provided. The second holding tool 90 includes upper 92 and lower 94 holding members. The second holding tool 90 is rotatably supported by external support means (not shown(for rotation about a third rotary axis 95. The upper 92 and lower 94 holding members have complementary upper 96 and lower 98 clamping surfaces, respectively adapted for nestingly supporting the housing blank 60 therebetween. The upper 96 and lower 98 clamping surfaces each extend between the outer peripheral surface 91 of the second holding tool 90. The housing blank 60 is placed into and clamped between the upper 96 and lower 98 clamping surfaces such that the rim axis 61 is aligned with the third rotary axis 95 and the bulbuous lip 84 protrudes radially beyond the outer peripheral surface 91.

A gear forming tool 100 having a gear forming surface 102 for forming the teeth of the rim gear 30 is provided and rotatably supported by external support means (not shown) for rotation about a fourth rotary axis 104.

The second holding tool 90 and the gear forming tool 100 are rotated in opposite directions about their respective third 95 and fourth 104 rotary axes by any suitable means, such as an electric motor, at preselected fixed or variable speeds. The housing blank 60, clamped between the upper 96 and lower 98 clamping surfaces, rotates with the second holding tool 90. The gear forming tool 100 is displaced toward the second holding tool 90 by any suitable means, such as a hydraulic cylinder, so that the gear forming surface 102 frictionally engages the lip 84. The gear forming surface 102 is forcibly held against the lip 84. The gear forming surface 102 cuts and plastically deforms the lip 84 to form the teeth of the rim gear 30. The gear forming surface 102 may be applied to the lip 84 in successive steps until a final desired shape for the teeth of the rim gear 30 is achieved. Thus, a rim gear 30 is integrally formed in the housing 20 without welding and with minimal material loss.

Figure 6:
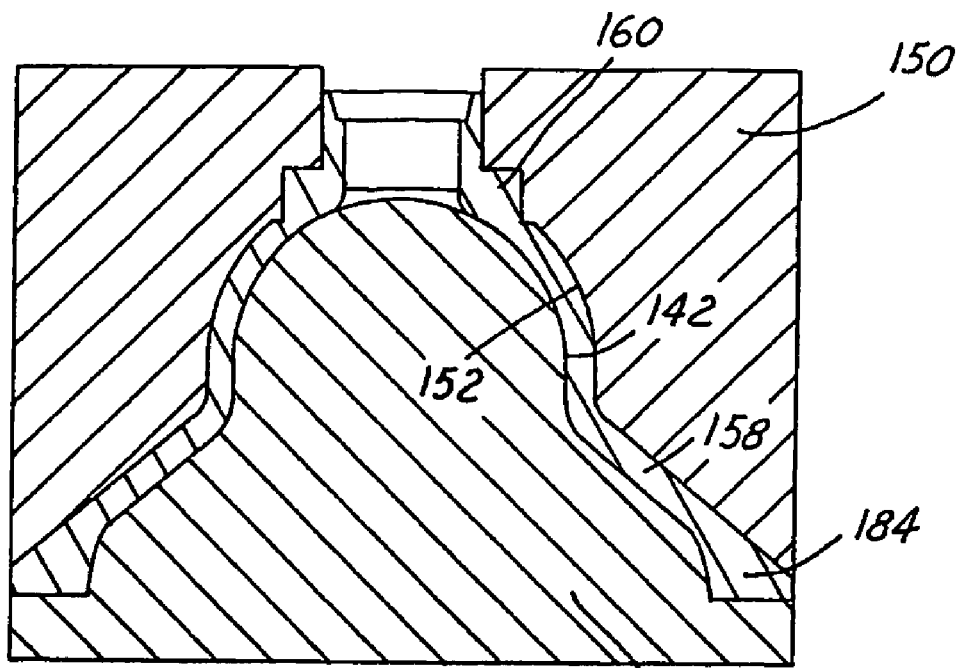
FIG. 6 is a cross sectional view of the die tool according to a second embodiment of the invention.

An alternative method of integrally forming the rim gear 30 in the housing 20 is shown in FIG. 6. The upper die 150 is forcibly moved to the closed position, whereby the housing blank 160 is compressed between the lower 142 and upper 152 tool surfaces of the lower 140 and upper 150 dies. The housing blank 160 is flow or cold formed to retain the general shape of the cavity 158 formed between the lower 142 and upper 152 tool surfaces in the closed position. A thickened lip 184 is formed in the housing blank 160 without the intermediate steps of utilizing successive thickening tools. The rim gear 30 is cut and formed from the thickened lip 184, as discussed.

Figure 7:
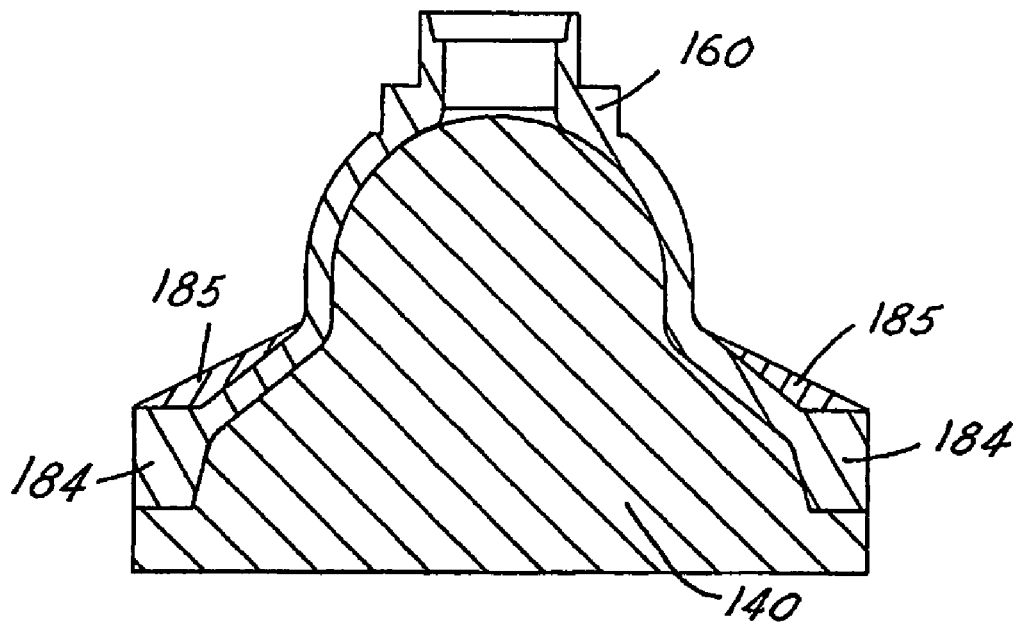
FIG. 7 is a cross sectional view of the die tool according to a third embodiment of the invention.

As best shown in FIG. 7 excess material 185 may be subsequently removed from the thickened lip 184 prior to forming the teeth of the rim gear 30 to achieve a desired shape of the lip 184 not possible with flow or cold forming alone.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A method of making a differential housing having a ring gear integrally formed therein, said method comprising the steps of:
    providing a housing blank having an annular rim;
    supporting the housing blank in a first rotatable holding tool so that the annular rim extends radially outwardly from the first holding tool for rotation therewith;
    rotating the first holding tool;
    applying a first thickening tool for engaging the annular rim during rotation of the first holding tool wherein the annular rim is plastically deformed to form a lip;
    supporting the housing blank in a second rotatable holding tool so that the lip extends radially outwardly from the second holding tool for rotation therewith; and
    applying a gear forming tool for engaging the lip during rotation of the second holding tool, whereby a plurality of teeth are formed along the lip to form the ring gear.

2. The method of making a differential housing of claim 1 wherein the first thickening tool rotates in an opposite direction relative to the first holding tool.

3. The method of making a differential housing of claim 1 further including applying additional thickening tools to plastically deform the annular rim to a desired lip dimension.

4. The method of making a differential housing of claim 1 wherein the first thickening tool is displaced towards the first holding tool for deforming the annular rim.

5. The method of making a differential housing of claim 1 wherein the annular rim is preformed prior to providing the housing blank.

6. The method of making a differential housing of claim 1 further including the step of flow forming the housing blank to form the annular rim prior to supporting the housing blank in the first rotatable holding tool.

7. The method of making a differential housing of claim 6 wherein the flow forming step comprises the steps of:
    providing lower and upper dies having pre-shaped surfaces, the upper die moveable relative to the lower die;
    introducing the housing blank onto the lower die and moving the upper die to compress the blank within a cavity defined by the upper and lower die pre-shaped surfaces wherein the annular rim is formed.

8. The method of making a differential housing of claim 1 wherein the gear forming tool is rotating in an opposite direction relative to the second holding tool.

9. The method of making a differential housing of claim 1 wherein the gear forming tool is displaced towards the second holding tool for forming the plurality of teeth.

10. The method of making a differential housing of claim 1 further including the step of removing material from the lip prior to the step of applying the gear forming tool.

* * * * *